US009125126B2

(12) United States Patent
Makh et al.

(10) Patent No.: US 9,125,126 B2
(45) Date of Patent: Sep. 1, 2015

(54) METHOD AND APPARATUS OF MEASURING AND RESELECTING CELLS

(71) Applicant: QUALCOMM Incorporated, San Diego, CA (US)

(72) Inventors: Vansh Pal Singh Makh, Mountain View, CA (US); Harish Venkatachari, Sunnyvale, CA (US); Jittra Jootar, San Diego, CA (US); An-Swol Clement Hu, Belmont, CA (US); Chih-Ping Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 13/740,647

(22) Filed: Jan. 14, 2013

(65) Prior Publication Data

US 2013/0244647 A1 Sep. 19, 2013

Related U.S. Application Data

(60) Provisional application No. 61/610,569, filed on Mar. 14, 2012.

(51) Int. Cl.
H04W 48/12 (2009.01)
H04W 48/16 (2009.01)
H04W 36/30 (2009.01)

(52) U.S. Cl.
CPC .............. *H04W 36/30* (2013.01); *H04W 48/16* (2013.01)

(58) Field of Classification Search
CPC ................................ H04W 48/12; H04W 48/16
USPC .......................................................... 455/434
See application file for complete search history.

(56) References Cited

U.S. PATENT DOCUMENTS

2003/0040312 A1* 2/2003 Tohono .......................... 455/434
2007/0064642 A1* 3/2007 Watabe et al. ................. 370/324

(Continued)

FOREIGN PATENT DOCUMENTS

| EP | 1313336 | 5/2003 |
| EP | 1499143 A2 | 1/2005 |
| WO | 2009007720 | 1/2009 |

OTHER PUBLICATIONS

3GPP TS 36.304, V10.5.0, "3rd Generation Partnership Project; Technical Specification Group Radio Access Network; Evolved Universal Terrestrial Radio Access (E-UTRA); User Equipment (UE) procedures in idle mode (Release 10)", 3GPP Standard; 3GPP TS 36.304, 3rd Generation Partnership Project (3GPP), Mobile Competence Centre ; 650, Route Des Lucioles ; F-06921 Sophia-Antipolis Cedex ; France, vol. RAN WG2, No. V10.5.0, Mar. 12, 2012, pp. 1-33, XP050580016.

(Continued)

*Primary Examiner* — Christopher M Brandt
(74) *Attorney, Agent, or Firm* — Charles E. Eggers

(57) ABSTRACT

Methods and apparatus of monitoring cells in a wireless communication system may include determining existence of a condition for performing a cell search on a frequency. In addition, the methods and apparatus may include calculating an undetected energy-related value for a hypothetical undetected cell based on a measured energy-related value of each detected cell on the frequency in response to determining the condition for performing the cell search. The methods and apparatus may further include determining whether to perform the cell search based on the undetected energy-related value and a reselection criteria.

39 Claims, 10 Drawing Sheets

(56) References Cited

U.S. PATENT DOCUMENTS

| | | |
|---|---|---|
| 2010/0323631 A1* | 12/2010 | Martin et al. ............ 455/67.11 |
| 2011/0207453 A1 | 8/2011 | Hsu et al. |
| 2012/0015648 A1 | 1/2012 | Roberts et al. |
| 2012/0021725 A1 | 1/2012 | Rune |
| 2012/0069816 A1 | 3/2012 | Bhandari et al. |
| 2012/0176918 A1 | 7/2012 | Callender et al. |
| 2012/0270537 A1* | 10/2012 | Weng et al. ............... 455/424 |

OTHER PUBLICATIONS

International Search Report and Written Opinion—PCT/US2013/031280—ISA/EPO—Mar. 24, 2013.

* cited by examiner

METHOD AND APPARATUS OF MEASURING AND RESELECTING CELLS

CLAIM OF PRIORITY UNDER 35 U.S.C. §119

The present application for patent claims priority to Provisional Application No. 61/610,569 entitled "Method and Apparatus of Measuring and Reselecting Cells" filed Mar. 14, 2012, and assigned to the assignee hereof and hereby expressly incorporated by reference herein.

BACKGROUND

1. Field

Aspects of the present disclosure relate generally to wireless communication systems, and more particularly, to methods and apparatus of monitoring radio channels.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In UMTS, a wireless communication device, referred to as a user equipment (UE), regularly searches for a better cell to camp on according to a cell reselection criterion. This mechanism insures an acceptable quality of the camping cell, and achieves a desired call setup performance or power savings. For example, a very reactive cell reselection mechanism can guarantee an adequate quality of the camping cell at the expenses of stand-by time, which is decreased by frequent reselections.

Therefore, improved cell reselection mechanisms are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of a wireless device monitoring cells in a wireless communication system. The method may include determining existence of a condition for performing a cell search on a frequency. The method may also include calculating, via a processor on the wireless device, an undetected energy-related value for a hypothetical undetected cell based on a measured energy-related value of each detected cell on the frequency in response to determining the condition for performing the cell search. In addition, the method may include determining whether to perform the cell search based on the undetected energy-related value and a reselection criteria.

Another aspect relates to an apparatus for wireless communication. The apparatus may include means for determining existence of a condition for performing a cell search on a frequency. The apparatus may also include means for calculating an undetected energy-related value for a hypothetical undetected cell based on a measured energy-related value of each detected cell on the frequency in response to determining the condition for performing the cell search. The apparatus may further include means for determining whether to perform the cell search based on the undetected energy-related value and a reselection criteria.

Yet another aspect relates to a computer program product, comprising a computer-readable medium comprising code for determining existence of a condition for performing a cell search on a frequency; calculating an undetected energy-related value for a hypothetical undetected cell based on a measured energy-related value of each detected cell on the frequency in response to determining the condition for performing the cell search; and determining whether to perform the cell search based on the undetected energy-related value and a reselection criteria.

Another aspect relates to an apparatus for wireless communication. The apparatus may include at least one processor. The apparatus may further include a memory coupled to the at least one processor, wherein the at least one processor is configured to: determine existence of a condition for performing a cell search on a frequency; calculate an undetected energy-related value for a hypothetical undetected cell based on a measured energy-related value of each detected cell on the frequency in response to determining the condition for performing the cell search; and determine whether to perform the cell search based on the undetected energy-related value and a reselection criteria.

Still another aspect relates to an apparatus for monitoring cells in a wireless communication system. The apparatus may include a condition determiner component operable to determine existence of a condition for performing a cell search on a frequency. The apparatus may also include an energy calculator component operable to calculate an undetected energy-related value for a hypothetical undetected cell based on a measured energy-related value of each detected cell on the frequency in response to determining the condition for performing the cell search. In addition, the apparatus may include a cell search determiner component operable to determine whether to perform the cell search based on the undetected energy-related value and a reselection criteria.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described apparatus and methods provide a mechanism for improving wireless device, e.g., user equipment (UE), performance and/or saving power when monitoring for and measuring neighbor cells, such as in a cell reselection procedure.

For example, for a wireless device in a WCDMA idle mode, the purpose of periodic cell searches is to try to find undetected cells that might rank better than the serving cell. According to the described aspects, however, when there are a number of cells short-listed in an active set (ASET) and/or a monitored set (MSET) that are already monitored, then there is no need to try to detect any undetected cells when it is determined that these undetected cells cannot rank better than the active serving cell.

As such, the described aspects enable improved power savings and standby time by skipping any cell searches when it is determined that there is no undetected cell on a particular frequency that meets the reselection criteria, e.g., in terms of Common Pilot Indicator CHannel (CPICH) received signal code power (RSCP) and/or a ratio of CPICH received energy per chip to a received overall energy (Ec/Io) at the current instant. Instead of performing a cell search, the reselection criteria can instead be evaluated using a list search, e.g., measuring the short-listed or already-detected cells. In other words, based on intra- and inter-frequency list searches, a total signal strength of known cells on a particular frequency can be used to compute an Ec/Io and/or RSCP (e.g., highest possible energy) of a strongest possible (e.g., hypothetical) undetected cell on that particular frequency. This computed value for the strongest possible undetected cell on that particular frequency can then be evaluated relative to the reselection criterion. When the reselection criterion using this highest possible energy is not met, then a cell search on that particular frequency can be skipped.

Figure 1:
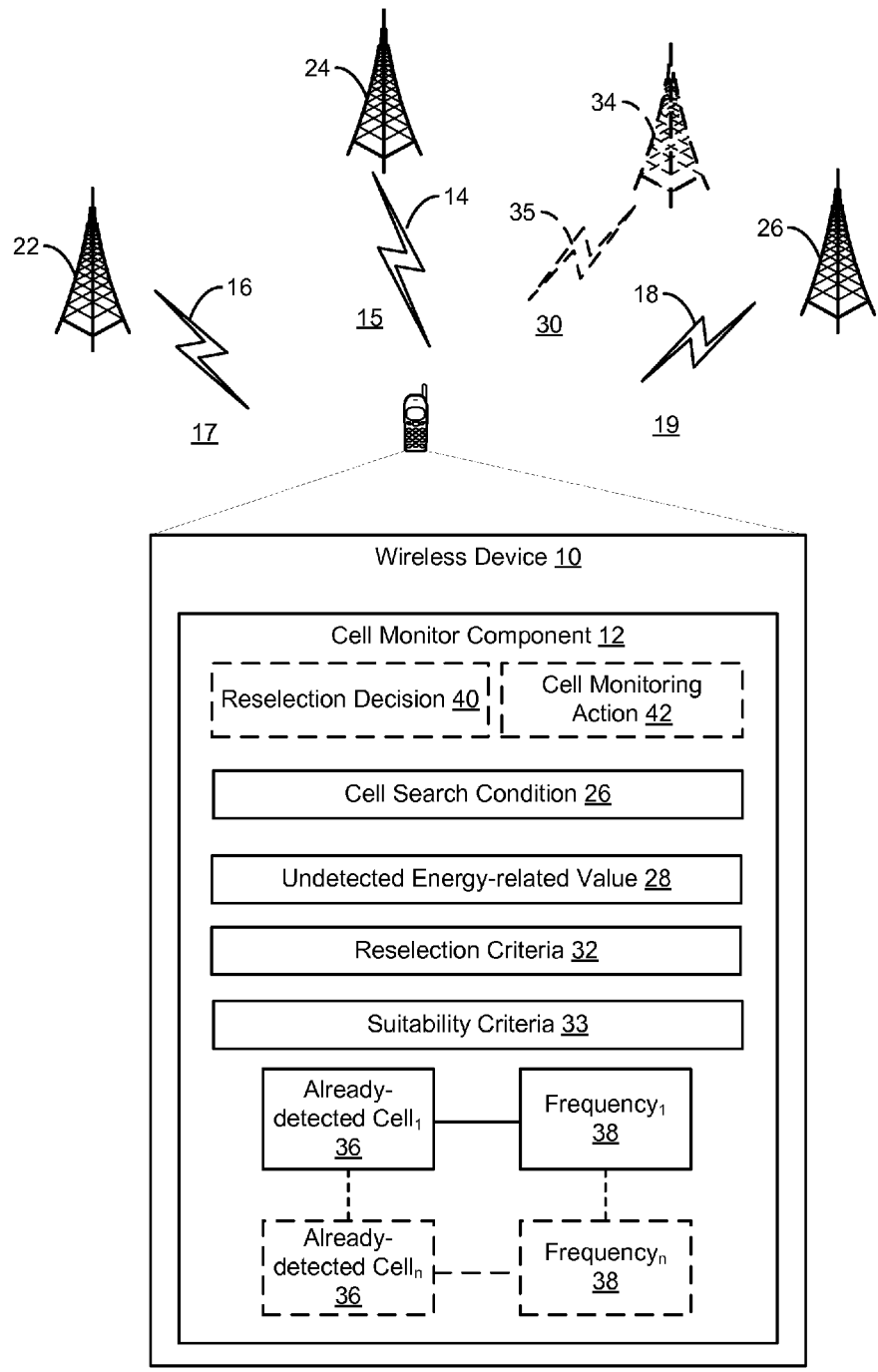
FIG. 1 is schematic diagram of an aspect of a wireless device for monitoring radio channels, including evaluating a hypothetical undetected cell in order to determine whether a cell search in a cell reselection procedure can be skipped.

Referring to FIG. 1, in one aspect, a wireless device 10 having improved reselection performance and/or power savings includes a cell monitoring component 12 configured to skip the performance of a cell search, e.g., in a cell reselection procedure, when it is not possible for a hypothetical undetected cell on a particular frequency to meet the reselection criteria.

For example, cell monitoring component 12 may perform an idle mode cell measurement and monitoring procedure, such as a cell reselection procedure, to identify cell reselection candidates based on signal measurements. In some cases, cell monitoring component 12 may perform a WCDMA cell reselection procedure. For instance, cell monitoring component 12 initiates periodic monitoring and measuring of signals 16 and 18, such as pilot signals, broadcast by neighbor base stations 20 and 22 adjacent to serving or camping base station 24 supporting a cell 15 where wireless device 10 is currently camped, e.g., a serving cell. Signals 16 and 18 respectively advertise cells 17 and 19 supported by the respective base stations 20 and 22. Such periodic monitoring and measuring of signals may be intra-frequency measurements that occur on a same frequency as signal 14, such as a pilot signal, broadcast by serving base station 24 for serving cell 15 on which wireless device 10 is camped, and/or inter-frequency measurements on different frequencies. In the idle mode, such a cell measurement and monitoring procedure allows wireless device 10 to determine, among other things, a signal power such as a RSCP and/or Ec/Io, which can be used in determining to reselect a new cell on which to camp. For example, wireless device 10 may reselect and camp on a new cell when the power level of the new cell, such as one of neighbor cells 17 or 19, meets a cell reselection criteria relative to a power of serving cell 15 on which wireless device 10 is currently camped. It should be noted that the described apparatus and methods may also be utilized in a connected mode process, however, the power savings may not be as significant since wireless device 10 is already ON.

For instance, in idle mode, wireless device 10 operates in discontinuous reception (DRX) to improve its stand-by time. It should be noted that idle mode procedures may be specified in, for example, 3GPP TS 25.304, "User Equipment (UE) procedures in idle mode and procedures for cells reselection in connected mode," 3GPP TS 25.133, "Requirements for support of radio resource management (FDD)," and 3GPP TS 25.123, "Requirements for Support of Radio Resource Management (TDD)," hereby incorporated by reference herein. In an aspect, at the beginning of each DRX cycle, wireless device 10 wakes up, reacquires the camping cell, measures the CPICH Ec/Io and/or CPICH RSCP level of the camping cell and evaluates cell measurement criterion, which may be defined by the network and/or by a wireless communication specification, e.g., an "S" or selection threshold. Depending on the measured CPICH Ec/Io and/or CPICH RSCP level of the camping cell relative to the cell measurement criterion, and/or depending on a timing for performing cell searches (as opposed to a timing for performing a shortened search, such as a "list search," for already identified cells), wireless device 10 may trigger intra- and/or inter-frequency measurements and evaluate detected cells relative to the cell reselection criterion. For example, in one use case, the condition for performing a cell search may occur every 30 seconds, and given that the serving cell EcIo<S or measurement threshold.

According to the described aspects, however, cell monitoring component 12 may enable wireless device 10 to avoid having to perform a cell search, such as for one or more frequencies provided to wireless device 10 by the network, such as in a system information message received from serving base station 24. It should be noted that the cell search may be a search to find unidentified or undetected cells. For example, the cell search may include a search of all cells and/or timing hypotheses on a frequency. In addition, the cell search may include a search that is one or more phases of a cell search, where each phase includes a subset of cells (e.g., less than all cells) and/or a subset of timing hypotheses (e.g., less than all timing hypotheses), on the frequency. Specifically, in an aspect, cell monitoring component 12 is configured to determine, upon existence of a cell search condition 26 for performing a cell search, whether or not to perform the cell search based on an undetected energy-related value 28 for a hypothetical undetected cell 30 and a reselection criteria 32. In other words, if it is not theoretically possible for hypothetical undetected cell 30 associated with base stations 20, 22, 24, or a hypothetical base station 34 to have a hypothetical signal 35 on a frequency with enough energy to meet reselection criteria 32, which provides one or more thresholds for wireless device 10 to consider hypothetical undetected cell 30 for cell reselection, then cell monitoring component 12 of the present apparatus and methods enables skipping the cell search of that frequency for undetected cells, as such a search would theoretically waste time, as well as wasting processing and power resources. Moreover, in another aspect, cell monitoring component 12 is configured to determine, upon existence of cell search condition 26 for performing the cell search and after performing one or more given phases of the cell search, to re-evaluate whether or not the cell search should be continued based on recalculating the undetected energy-related value 28 for the hypothetical undetected cell 30 after the given one or more phases. For example, according to this aspect, the phasing of the cell search or "phased cell search" may include, but is not limited to, searching for a disjoint subset of cells in each phase, or searching for all cells but using a subset of one or more timing hypotheses in each phase. In other words, according to this aspect, rather than performing search of all the cells on the frequency, cell monitoring component 12 may enable a phased approach wherein the cell search may be stopped when the recalculated value of the undetected energy-related value 28 for the hypothetical undetected cell 30 after a given phase does not meet reselection criteria 32, thereby indicating that any hypothetical undetected cell 30 is not worth further consideration.

In another aspect, cell monitoring component 12 may be configured to determine, upon existence of a cell search condition 26 for performing a cell search, whether to perform the cell search based on an undetected energy-related value 28 for a hypothetical undetected cell 30 and a suitability criteria 33. Suitability criteria 33 may include one or more conditions and/or thresholds that must be met in order for a candidate cell to be considered for cell reselection. Example suitability criteria may include, but are not limited to, a minimum required quality level for the detected cells on the frequency and/or a minimum received signal level for the detected cells on the frequency. Thus, if it is not theoretically possible for hypothetical undetected cell 30 associated with base stations 20, 22, 24, or a hypothetical base station 34 to have a hypothetical signal 35 with enough quality to meet suitability criteria 33, which provides one or more quality level thresholds for wireless device 10 to consider hypothetical undetected cell 30 for cell reselection, then cell monitoring component 12 may skip the cell search of that frequency for undetected cells, as such a search would theoretically waste time, as well as wasting processing and power resources.

Cell search condition 26 may include, but is not limited to, occurrence of a periodic time for performing a cell search. For example, wireless device 10 may maintain a cell search timer, and perform the cell search during a DRX cycle that occurs when the cell search timer has expired. In one use case, for instance, the cell search period, and hence the cell search timer, may be a 30 second time period. Alternatively, or in addition, cell search condition 26 may include detecting, during a DRX cycle, that cell 15 on which wireless device 10 is currently camped may no longer be of sufficient quality. For instance, in this case, cell 15 on which wireless device 10 is currently camped may no longer meet a cell measurement criteria, e.g., an S threshold, such as a threshold CPICH Ec/Io and/or CPICH RSCP level, or a threshold CPICH Ec/Io and/or CPICH RSCP level over a time period and including a hysteresis parameter. It is noted that cell measurement criteria may be different from, or the same as, cell reselection criteria 32. Alternatively, or in addition, cell search condition 26 may occur when the serving cell EcIo<S threshold, and when 30 seconds have expired since the last cell search on the frequency. Additionally, in another aspect, such as a non-absolute priority case, cell search condition 26 may occur when the serving cell EcIo<Sintra-search threshold and when the serving cell EcIo<Sinter-search threshold, which may be thresholds defined by a wireless communication specification and/or the network, and further when 30 seconds have expired since the last cell search was done on the frequency.

Undetected energy-related value 28 for hypothetical undetected cell 30 may include, but is not limited to, a calculated value of a hypothetic energy based on a value of total energy in a frequency and a measured energy of detected signals on the frequency. For instance, in an aspect, undetected energy-related value 28 on the frequency may include the measured energy of detected signals on the frequency subtracted from the value of the total energy in the frequency. For example, wireless device 10 may obtain the total energy in a frequency based on wireless device measurements or by obtaining the value from communication with the network, such as in a system information message, or the total energy in a frequency may be preconfigured on wireless device 10. Further, for example, the measured energy of detected signals on the frequency may include a sum of the measured energy of the detected signals, such as one or any combination of CPICH Ec/Io and/or CPICH RSCP levels of one or any combination of pilot signals, control signals, traffic signals, and/or any other overhead channel signals and/or traffic channel signals detected and measured in the frequency. For instance, in one use case, the measured energy of detected signals on the frequency may include a sum of CPICH Ec/Io and/or CPICH RSCP levels for already identified cells in the frequency, such as cells in an active set and/or a monitored set, e.g., a set of detected cells already being tracked in a search list. It should be noted that the inclusion of one or more of pilot signals, control signals, traffic signals, and/or any other overhead channel signals and/or traffic channel signals may vary depending on a desired accuracy and/or cell reselection sensitivity, or depending on a desired ease of computation.

Reselection criteria 32 may include one or more conditions and/or thresholds that must be met in order for a candidate cell to be considered as a potential cell reselection candidate in the near future. For instance, reselection criteria 32 may include a condition for the cell to have a measured CPICH Ec/Io and/or CPICH RSCP level that meets a corresponding CPICH Ec/Io threshold and/or CPICH RSCP threshold. Alternatively, or in addition, reselection criteria 32 may further include conditions such as maintaining a measured CPICH Ec/Io and/or CPICH RSCP level for a certain time period, and/or that the CPICH Ec/Io threshold and/or CPICH RSCP threshold includes a hysteresis parameter that biases toward the current camped on cell to avoid a cell reselection ping-pong effect. Moreover, reselection criteria 32 may further include a ranking algorithm such that only a select number of identified cells are fully evaluated for cell reselection. For instance, reselection criteria 32 may implement a ranking algorithm such that only a given number of cells having a highest measured energy-related value, which may be over a certain time period, are considered. In some aspects, such select number of detected cells may be referred to as an active set and/or a monitored set of cells.

As such, when cell monitoring component 12 determines to skip the cell search of a frequency based on undetected energy-related value 28 for a hypothetical undetected cell 30 and reselection criteria 32, cell monitoring component 12 may instead base the cell reselection evaluation on already-detected cells 36 in one or more identified frequencies 38. For instance, in one use case, already-detected cells 36 may include the above-described active set and/or a monitored set of cells. In this case, rather than performing a cell search on all possible cells and/or identified frequencies, cell monitoring component 12 performs new measurements on already-detected cells 36 in one or more identified frequencies 38. As such, cell monitoring component 12 thereby evaluates already-detected cells 36 against reselection criteria 32 to make a reselection decision 40 that triggers a cell monitoring action 42. For example, in one alternative, reselection decision 40 may represent a decision to perform a reselection to one of the already-detected cells 36 meeting reselection criteria 32, thereby causing cell monitoring action 42 to be performing a reselection to camp on the one of the already-detected cells 36 meeting reselection criteria 32. Further, for example, in another alternative, reselection decision 40 may represent a decision to not perform a reselection, e.g., when none of the already-detected cells 36 meet reselection criteria 32. In this alternative, reselection decision 40 to not perform the reselection may cause cell monitoring action 42 to be skipping the cell search in the current DRX cycle and re-evaluate next time cell search condition 26 is met, e.g., which could be the next DRX cycle since a cell search timer has not been reset, and/or resetting of the cell search timer. Moreover, in another aspect, for example, the phase search may include a selective phase search. Thus, rather than randomly performing a phased cell search, cell monitoring component 12 may select the subset of cells/hypotheses to be searched in a given phase. For example, the selected subset of cells/hypotheses may not include already-detected cells 36. In another example, the selected subset of cells may include a complement of the already-detected cells 36. In yet another example, the selected subset of cells may include an intersection of cells with the set of cells advertised by the network.

Thus, the present apparatus and methods include wireless device 10 and/or cell monitoring component 12 that evaluate whether hypothetical undetected cell 30 on a particular frequency can theoretically meet reselection criteria 32, and if not, the present apparatus and methods allow skipping performance of a cell search procedure during cell reselection, thereby resulting in improved reselection performance and/or power savings for wireless device 10.

Figure 2:
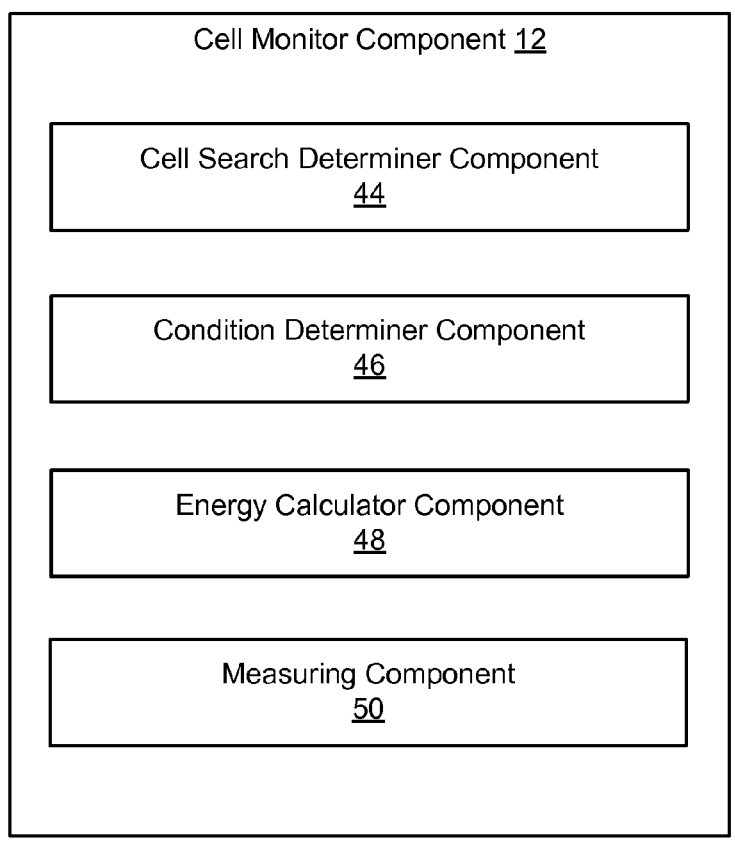
FIG. 2 is a block diagram of an aspect of the cell monitor component of FIG. 1.

Referring to FIG. 2, in an aspect, cell monitoring component 12 may include a cell search determiner component 44 configured to determine, upon existence of cell search condition 26 for performing a cell search, whether to perform the cell search based on undetected energy-related value 28 for hypothetical undetected cell 30 on a given frequency, a reselection criteria 32 and/or a suitability criteria 33. For example, cell search determiner component 44 may be triggered by a signal from condition determiner 46, which identifies when cell search condition 26 occurs. For example, condition determiner 46 may include a cell search timer having a time value that corresponds to a desired frequency for performing a cell search. As such, upon expiration of cell search timer, condition determiner 46 detects cell search condition 26 and signals cell search determiner component 44 to initiate evaluation of whether a cell search needs to be performed. Alternatively, or in addition, cell search condition 26 may occur when the serving cell EcIo<S threshold, and when 30 seconds have expired since the last cell search on the frequency. Additionally, in another aspect, such as a non-absolute priority case, cell search condition 26 may occur when the serving cell EcIo<Sintra-search threshold and when the serving cell EcIo<Sinter-search threshold, which may be thresholds defined by a wireless communication specification and/or the network, and further when 30 seconds have expired since the last cell search was done on the frequency.

Moreover, cell search determiner component 44 may obtain undetected energy-related value 28 for hypothetical undetected cell 30 from an energy calculator component 48. Energy calculator component 48 may be configured to determine or obtain the total energy for a given frequency, the measured energy-related values for detected signals in the frequency, and calculate undetected energy-related value 28 for hypothetical undetected cell 30 based on a given algorithm. For instance, the detected signal in the frequency may include signals, such as overhead and/or traffic signals, from already-detected cells 36 in the frequency. For instance, already-detected cells 36 may have been determined based on a prior short list search of cells in an active set and/or a monitored set. Moreover, the given algorithm executed by energy calculator component 48 may include one of a potential plurality of algorithms for calculating undetected energy-related value 28 for hypothetical undetected cell 30. For instance, the plurality of algorithms may take into account different signals, or make different assumptions, or consider absolute priority cases versus non-absolute priority cases, or make different simplifications in the calculations, etc.

In an aspect, energy calculator component 48 obtains the measured energy-related values for detected signals in the frequency from a measuring component 50. For instance, measuring component 50 may include one or more receivers or transceivers, and/or receive chain components, configured to monitor one or more frequencies, and detect and measure any signals present on the respective one or more frequencies.

Accordingly, cell search determiner component 44 may execute one or more cell search determination algorithms in order to compare undetected energy-related value 28 for hypothetical undetected cell 30 in a given frequency to reselection criteria 32 and/or suitability criteria 33, and thereby generate reselection decision 40 and perform a corresponding cell monitoring action 42, such as skipping a cell search and/or reselecting to a new cell.

Figure 3:
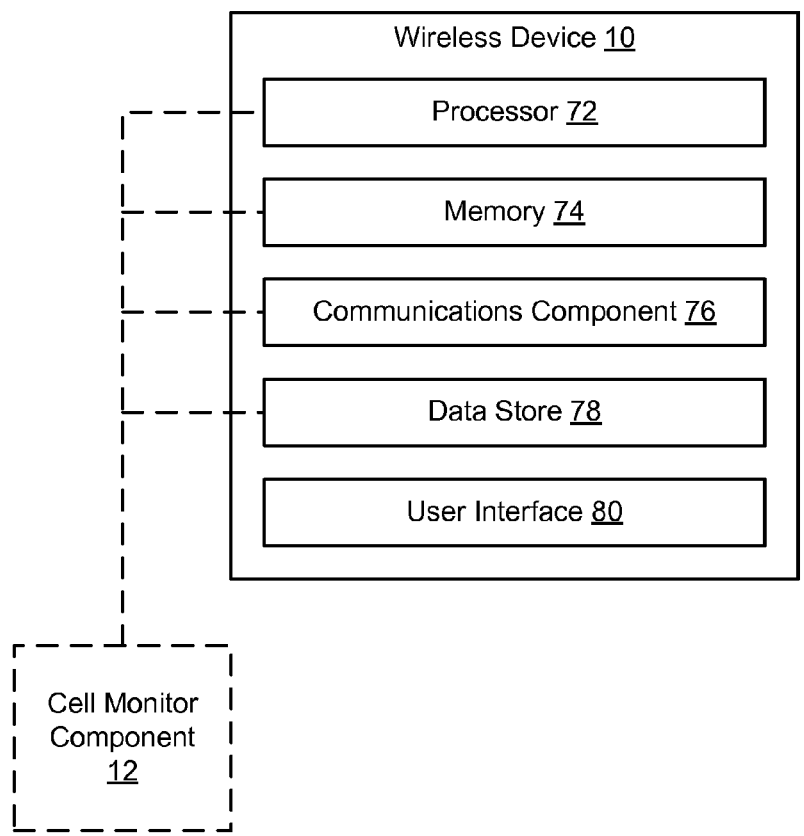
FIG. 3 is a block diagram of an aspect of the wireless device of FIG. 1.

Referring to FIG. 3, in one aspect, wireless device 10 (FIG. 1) may additionally include a processor 72 for carrying out processing functions associated with one or more of components and functions described herein. Processor 72 can include a single or multiple set of processors or multi-core processors. Moreover, processor 72 can be implemented as an integrated processing system and/or a distributed processing system. Additionally, processor 72 may be configured or specially-programmed with hardware, software, and/or firmware to perform one or more of the functions described herein with respect to cell monitoring component 12.

Wireless device 10 further includes a memory 74, such as for storing data used herein and/or local versions of applications or computer-readable instructions being executed by processor 72, e.g., to perform one or more of the functions described herein with respect to cell monitoring component 12. Memory 74 can include any type of memory usable by a computer, such as random access memory (RAM), read only memory (ROM), tapes, magnetic discs, optical discs, volatile memory, non-volatile memory, and any combination thereof.

Further, wireless device 10 includes a communications component 76 that provides for establishing and maintaining communications with one or more parties utilizing hardware, software, and services as described herein. Communications component 76 may carry communications between components on wireless device 10, as well as between wireless device 10 and external devices, such as devices located across a wired or wireless communications network and/or devices serially or locally connected to wireless device 10. For example, communications component 76 may include one or more buses, and may further include transmit chain components and receive chain components associated with a transmitter and receiver, respectively, or a transceiver, operable for interfacing with external devices. In an additional aspect, communications component 76 may include transmitters and receivers, or transceivers, and corresponding transmit and receive chain components, for more communication with more than one technology type network. Further, communications component 76 may be specially configured to perform one or more functions described herein with respect to cell monitoring component 12.

Additionally, wireless device 10 may further include a data store 78, which can be any suitable combination of hardware and/or software, that provides for mass storage of information, databases, and programs employed in connection with aspects described herein. For example, data store 78 may be a data repository for applications not currently being executed by processor 72, such as applications associated with cell monitoring component 12.

Wireless device 10 may additionally include a user interface component 80 operable to receive inputs from a user of wireless device 10, and further operable to generate outputs for presentation to the user. User interface component 80 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 80 may include one or more output devices, including but not limited to a display, a speaker, a haptic feedback mechanism, a printer, any other mechanism capable of presenting an output to a user, or any combination thereof.

In the present aspects, wireless device 10 may further include cell monitor component 12, for example, as a separate component or within or as part of processor 72, memory 74, communications component 76, or data store 78, or some combination thereof. For example, cell monitor component 12 may include specially programmed computer readable instructions or code, firmware, hardware, or some combination thereof, for performing the functions described herein.

A number of example use cases implementing the principles of the present apparatus and methods are described below. These use cases may be carried out, for example, by wireless device 10 executing cell monitoring component 12 of FIG. 1, and/or any components thereof as described in FIG. 2.

For example, in an aspect, if conditions for performing a cell search on any frequency fi are met, the apparatus and method may calculate undetected CPICH Ec/Io and RSCP on the frequency fi as $$UndetEcIo_{fi} = 10\log_{10}\left(1 - \sum_{\substack{A/MSET\ cells\ on\ fi \\ measured\ in\ last\ DRX}} \frac{Ec}{Io}\right) \quad (1)$$

$$UndetRSCP_{fi} = CandNghbrEcIo_{fi} + AGC_{fi} \quad (2)$$

where the summation is done over all cells on frequency fi that were measured in the previous DRX cycle and the $AGC_{fi}$ is the measured AGC value on fi, e.g., the total energy on the frequency, from the previous DRX cycle.

Further, in this case, the apparatus and method may include evaluating the reselection criteria using the above values and parameters provided by the network, e.g., such as in a system information message. If the reselection criteria are met, then the apparatus and methods of this aspect may proceed with the cell search. Otherwise, just perform a list search on fi on the monitored cells.

In equation (1), in order to calculate the undetected energies, only the CPICH portion of the known cells is subtracted from the total energy. In addition to this, the known overhead channels can also be canceled from the cells. For example, if α is the ratio between all overhead channels' combined energy (including CPICH), and CPICH energy, then (1) can be modified as $$UndetEcIo_{fi} = 10\log_{10}\left(\frac{1 - \sum_{\substack{A/MSET\ cells\ on\ fi \\ measured\ in\ last\ DRX}} \alpha\frac{Ec}{Io}}{\alpha}\right)$$

If the criteria is not met, some of the possible actions are:

(i) Skip the cell search in the current DRX cycle, without resetting the cell search timer, and re-evaluate next time the conditions for the cell search are met (which can be the next DRX cycle since the 30 second cell search timer has expired and has not been reset); or (ii) Reset the 30 second cell search timer.

Non-Absolute Priority Searches Case

In an aspect, the apparatus and methods may also include evaluating the cell suitability criteria to determine whether to proceed with the cell search. It should be noted that the cell suitability criteria may be evaluated in addition to the reselection criteria. For example, if the reselection criteria are met and the suitability criteria are met, the apparatus and methods may proceed with the cell search. Otherwise, if the reselection criteria are met, but the suitability criteria are not met, the apparatus and methods may not proceed with the cell search. Examples of suitability criteria conditions may include:

$$UndetNghbrEcIo_{fi} < Qqualmin_{min,fi} \quad (3)$$

$$UndetRSCP_{fi} < Qrxlevmin_{min,fi} + P_{compensation} \quad (4)$$

Further, the apparatus and methods may include ranking the reselection criteria using the values and parameters provided by the network, e.g., such as in a system information message. For example, the rankings may be used such that only a select number of identified cells are fully evaluated for cell reselection. Example rankings may include:

$$\frac{Ec}{Io_{serv\,cell}} + 3 + Qhyst2 - UndetEclo_{fi} + Qoffset2_{min,fi} + Offset_{mbms} > 0 \quad (5)$$

$$RSCP_{serv\,cell} + Qhyst1 - UndetRSCP_{fi} + Qoffset1_{min,fi} + Offset_{mbms} > 0 \quad (6)$$

where $$\frac{Ec}{Io_{serv\,cell}}$$

is filtered CPICH Ec/Io of serving cell $RSCP_{serve\,cell}$ is filtered RSCP of the serving cell respectively $$Offset_{mbms} = \begin{cases} 0 & \text{if both serving cell and neighbor are in } MBMS\,PL \\ Qoffmbms & \text{if only serving cell is in } MBMS\,PL \\ -Qoffmbms & \text{if only neighbor cell is in } MBMS\,PL \end{cases}$$

Qhyst1 is the Qhyst1 value advertized by the serving cell
Qhyst2 is the Qhyst2 value advertized by the serving cell
$Qoffset1_{min,\,fi}$=minimum Qoffset1 value amongst all neighbors defined for frequency fi
$Qoffset2_{min,\,fi}$=minimum Qoffset2 value amongst all neighbors defined for frequency fi
$Qrxlevmin_{min,fi}$=minimum required received signal (Qrxlevmin) value amongst all neighbors defined for frequency fi
$Qqualmin_{min,fi}$=minimum required quality level (Qqualmin$_{min,fi}$) value amongst all neighbors defined for frequency fi If the quality metric configured by the network is RSCP, equation (3) and equation (5) should be set to false. If any of the above conditions is true, the cell search can be skipped.

In the above equations, the use of the minimum offset values provides a conservative estimate that insures that the conditions defined by the wireless communications specifications are always met. It should be noted that other, non-minimum values may also be used, however, their use may not always guarantee conformance to the specification.

Possible Simplification:

For the serving cell frequency, with the assumption that, α=1 and the serving cell is the only known cell on that frequency, equation (5) becomes:

$$\frac{Ec}{Io_{serv\,cell}} + 3 + Qoffset2_{min,fi} +$$

$$Offset_{mbms} + Qhyst2 - 10\log_{10}\left(1 - 10^{\left(\frac{Ec}{Io_{serv\,cell}}\right)}\right) > 0 \Rightarrow$$

$$\frac{Ec}{Io_{serv\,cell}} > -10\log_{10}\left(1 + 10^{\frac{9 + Qoffset2_{min,fi} + Offset_{mbms} + Qhyst2}{10}}\right)$$

A lookup table can be used to map the $3+Qoffset2_{min,fi}+Offset_{mbms}+Qhyst2$ value to the required serving cell Ec/Io value in order to perform cell search according to the equation above.

Solving the above equation with the assumption that Qhyst2=0 Qoffset2$_{min,fi}$=0 and Offset$_{mbms}$=0 leads to the condition:

$$\frac{Ec}{Io_{serv\,cell}} > -4.76 \text{ dB}$$

e.g., if the serving cell is greater than −4.76 dB, no other cell can be ranked 3 dB higher than it and so the reselection criteria cannot be met for any other cell on that frequency (under the stated assumptions).

Absolute Priority

For absolute priority, the following reselection criteria can be used for W layers (e.g., WCDMA layers) to block cell searches:

If Thresh$_{x,high2}$ or Thresh$_{x,low2}$ are not provided for this layer:
If inter-frequency layer has higher absolute priority:

$$UndetRSCP_{fi} - Qrxlevmin_{min,fi} < Thresh_{x,high} \quad (7)$$

If inter-frequency layer has equal or lower absolute priority:

$$UndetRSCP_{fi} - Qrxlevmin_{min,fi} < Thresh_{x,low} \quad (8)$$

If Thresh$_{x,high2}$ or Thresh$_{x,low2}$ are provided for this layer:
If inter-frequency layer has higher absolute priority:

$$UndetEclo_{fi} - Qqualmin_{min,fi} < Thresh_{x,high} \quad (9)$$

If inter-frequency layer has equal or lower absolute priority:

$$UndetEcio_{fi} - Qqualmin_{min,fi} < Thresh_{x,low2} \quad (10)$$

where,
Thresh$_{x,high1}$=Srxlev based threshold for each higher absolute priority layer.
Thresh$_{x,high2}$=Squal based threshold for each higher absolute priority layer.
Thresh$_{x,low1}$=Srxlev based threshold for each equal or lower absolute priority layer.
Thresh$_{x,low2}$=Squal based threshold for each equal or lower absolute priority layer.

Thus, according to the described apparatus and methods, wireless device 10 operating cell monitor component 12 is capable of skipping a cell search in an idle mode reselection procedure, thereby increasing power efficiency and/or cell reselection performance.

Figure 4:
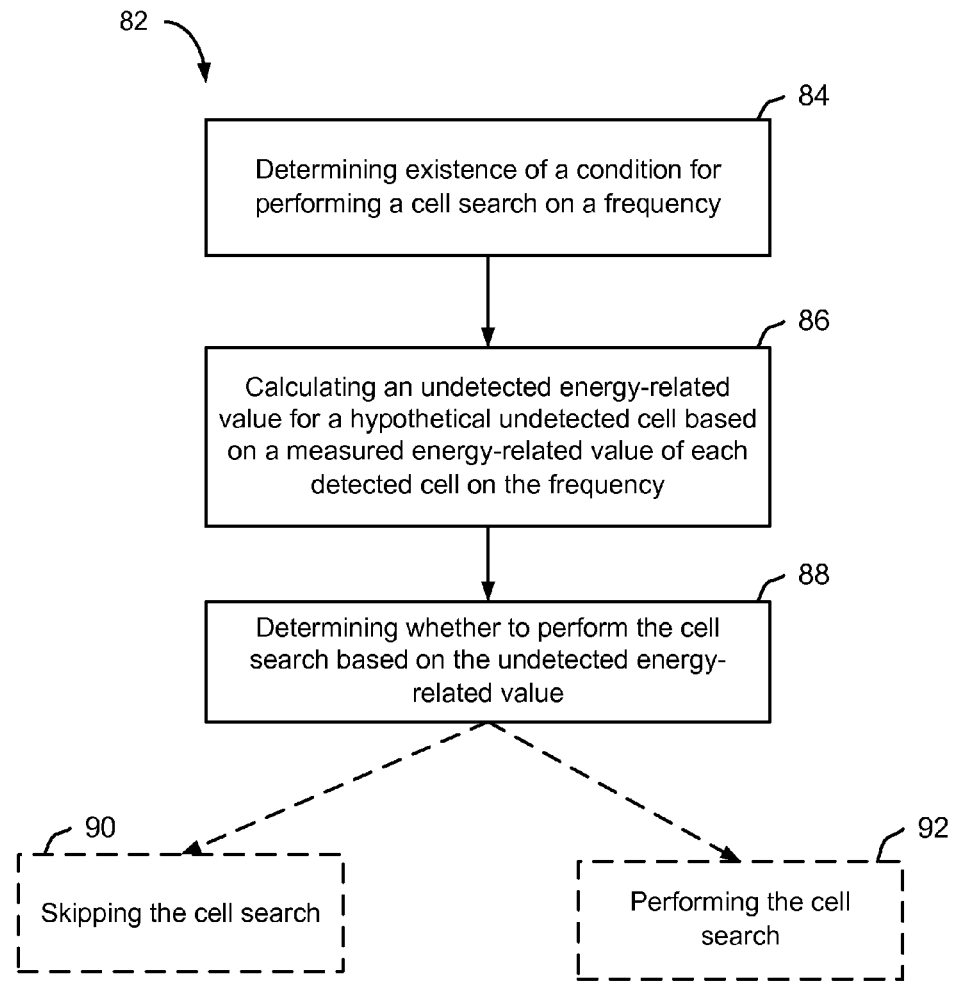
FIG. 4 is a flowchart of an aspect of a method of monitoring radio channels.

Referring to FIG. 4, in operation, an example method 82 for monitoring wireless signals is provided. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In an aspect, at block 84, method 82 includes determining existence of a condition for performing a cell search on a frequency. In an aspect, condition determiner component 46 (FIG. 2) may determine an existence of a condition for performing the cell search on the frequency. For example, this portion of method 82 may include setting a cell search timer, and detecting expiration of the cell search timer to define existence of the cell search condition. Also, in an aspect, determining existence of the condition for performing the cell search occurs when the wireless device is in an idle mode.

Further, at block 86, method 82 includes calculating an undetected energy-related value for a hypothetical undetected cell based on a measured energy-related value of each detected cell on the frequency in response to determining the condition for performing the cell search. In an aspect, energy calculator component 48 (FIG. 2) may calculate the undetected energy-related value for the hypothetical undetected cell. For example, calculating the undetected energy-related value further comprises calculating a pilot signal power-related value, such as a Common Pilot Indicator CHannel (CPICH) received signal code power (RSCP) or a ratio of CPICH received energy per chip to a received overall energy (Ec/Io).

Optionally, calculating the undetected energy-related value for the hypothetical undetected cell is based on the measured energy-related value of each detected cell on the frequency and a total energy on the frequency. For instance, in an aspect, the measured energy-related value of each detected cell on the frequency may be subtracted from a total energy on the frequency. Further, for example, calculating the undetected energy-related value for the hypothetical undetected cell may include measuring a pilot signal power-related value for each detected cell on the frequency, where calculating the undetected energy-related value is further based on a combination of each measured pilot signal power-related value subtracted from a total energy on the frequency. In another example, calculating the undetected energy-related value for the hypothetical undetected cell may include measuring signal power-related values of a plurality of overhead channels for each detected cell on the frequency, where calculating the undetected energy-related value is further based on a combination of the measured signal power-related values of a plurality of overhead channels subtracted from a total energy on the frequency. In yet another example, calculating the undetected energy-related value for the hypothetical undetected cell may include measuring signal power-related values of a plurality of traffic channels for each detected cell on the frequency, where calculating the undetected energy-related value is further based on a combination of the measured signal power-related values of a plurality of traffic channels subtracted from a total energy on the frequency.

Also, at block 88, method 82 includes determining whether to perform the cell search based on the undetected energy-related value for the hypothetical undetected cell on the frequency and a reselection criteria. For example, determining to perform the cell search may include comparing the undetected energy-related value for the hypothetical undetected cell on the frequency to one or more conditions that define the reselection criteria in order to determine whether or not the hypothetical undetected cell would be a theoretical candidate for cell reselection. In an aspect, cell search determiner component 44 (FIG. 2) may determine whether to perform the cell search based on the undetected energy-related value and the reselection criteria.

In addition, determining whether to perform the cell search may include comparing the undetected energy-related value for the hypothetical undetected cell on the frequency to one or more conditions that define a suitability criteria in order to determine whether the hypothetical undetected cell would be a theoretical candidate for cell reselection. For example, cell search determiner component 44 may also determine whether to perform the cell search based on the suitability criteria. Example suitability criteria may include, but are not limited to, a minimum required quality level for the detected cells on the frequency and/or a minimum received signal level for the detected cells on the frequency. It should also be noted that determining whether to perform the cell search may include comparing the undetected energy-related value for the hypothetical undetected call on the frequency to one or more conditions that define the reselection criteria and the suitability criteria.

Optionally, at block 90, method 82 further includes skipping the cell search when the undetected energy-related value for the hypothetical undetected cell on the frequency does not meet the reselection criteria and/or the suitability criteria. In an aspect, cell monitoring component 12 may skip the cell search when the undetected energy-related value does not meet the reselection criteria and/or the suitability criteria. For example, the skipping of the cell search includes skipping monitoring the frequency to detect other cells, and instead performing a search on only an already-detected cell or cells on the frequency. As such, rather than searching all possible frequencies, such as those frequencies in a list provided by the network, method 82 allows for frequencies to be skipped and/or for only searching already-detected cells instead of performing a cell search. Optionally, the skipping of the cell search may further include resetting a cell search timer.

Optionally, at block 92, method 82 may further include performing the cell search when the undetected energy-related value for the hypothetical undetected cell meets the reselection criteria and/or the suitability criteria. For example, cell monitoring component 12 may perform the cell search when the undetected energy-related value meets the reselection criteria and/or the suitability criteria. In this case, method 82 only performs the cell search when a hypothetical possibility exists for finding a strong cell, e.g., stronger than any already-detected cells on the frequency, which may qualify as a reselection candidate.

In an aspect, the cell search may be implemented in phases and/or steps. For example, each phase and/or step of the search may search for a subset of cells with a subset of timing hypothesis. Another example may include performing an initial search that locates the rough timing (e.g., slot timing) of a cell but does not identify the cell. The subsequent phases of the search may locate the frame timing, as well as the identity of the cell. Thus, it should be noted that there may be a variety of ways in which the cell search may be divided into phases and/or steps. The evaluation of the undetected energy-related value for the hypothetical undetected cell may occur at various stages of performing the cell search. For example, a first phase of the cell search may return a subset of cells and/or energy peaks that are detected on the frequency. Energy peaks may be detected because the search may not have identified the cell, but instead, may have identified the cell's rough timing. The method may then include determining whether to perform additional stages of the cell search for finding as yet undetected cells and/or energy peaks by re-computing the hypothetical undetected energy-related value considering the subset of detected cells and/or energy peaks from the first phase. In other words, the energy of the detected cells and/or energy peaks from the first phase reduces the value of the initially calculated undetected energy-related value 28 of hypothetical undetected cell 30. As such, a revised hypothetical undetected energy-related value is defined. Then, the method includes comparing the revised undetected energy-related value for the hypothetical undetected cell on the frequency to one or more conditions that define the reselection criteria in order to determine whether or not the hypothetical undetected cell would be a theoretical candidate for cell reselection. When the revised undetected energy-related value for the hypothetical undetected cell on the frequency meets the reselection criteria, the method may proceed with additional stages of the cell search for finding undetected cells and/or energy peaks and repeat the determination (including re-computing and comparing) based upon the results of the additional stages of the cell search. Alternatively, when the revised undetected energy-related value for the hypothetical undetected cell on the frequency does not meet the reselection criteria, the method may stop any remaining phases of the cell search for finding undetected cells and/or energy peaks. Therefore, the cell search may be suspended early in any phase of the search based upon the determination that occurs in each phase of the search whether the revised undetected energy-related value for the hypothetical undetected cell meets the reselection criteria.

Figure 5:
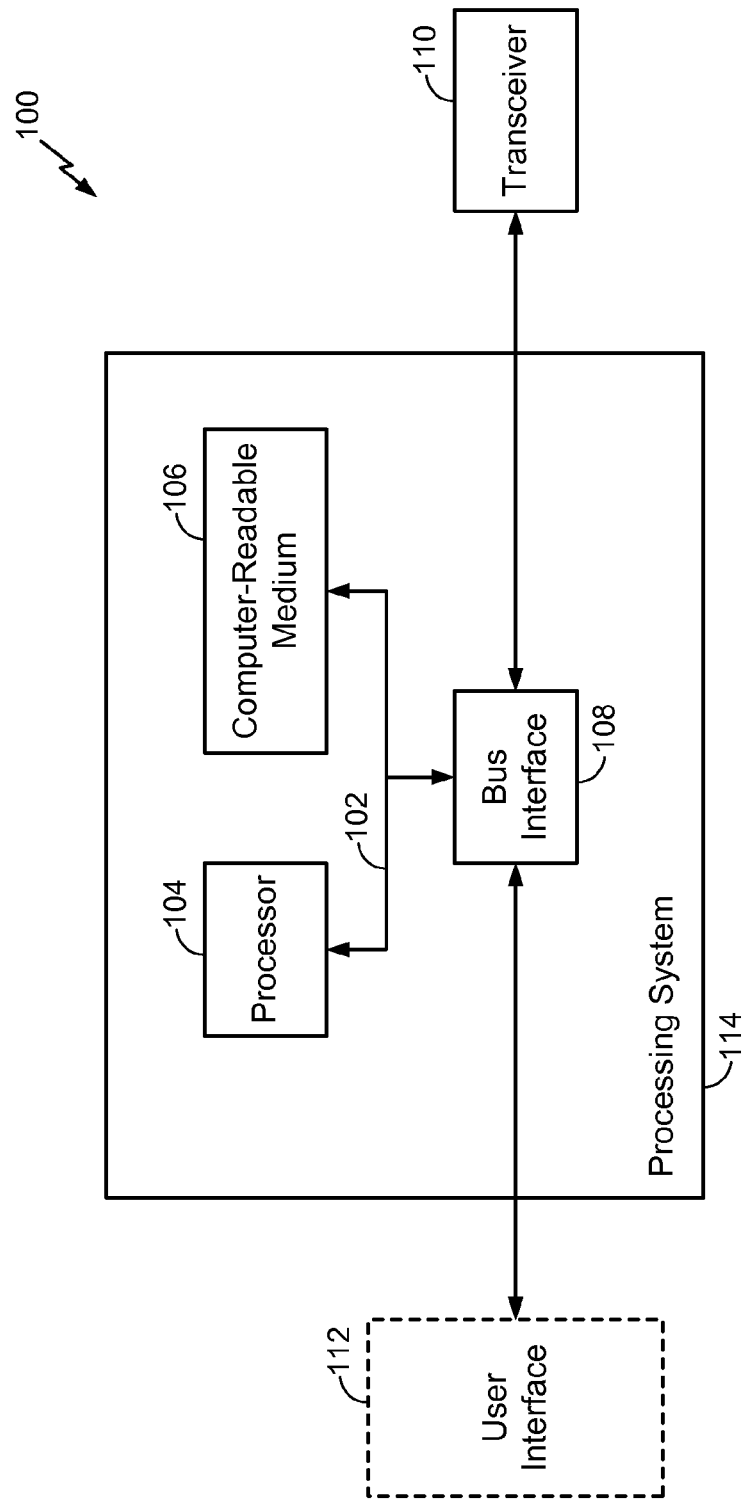
FIG. 5 is a block diagram illustrating an example of a hardware implementation for an apparatus employing a processing system and configured to perform the functions described herein.
Figure 6:
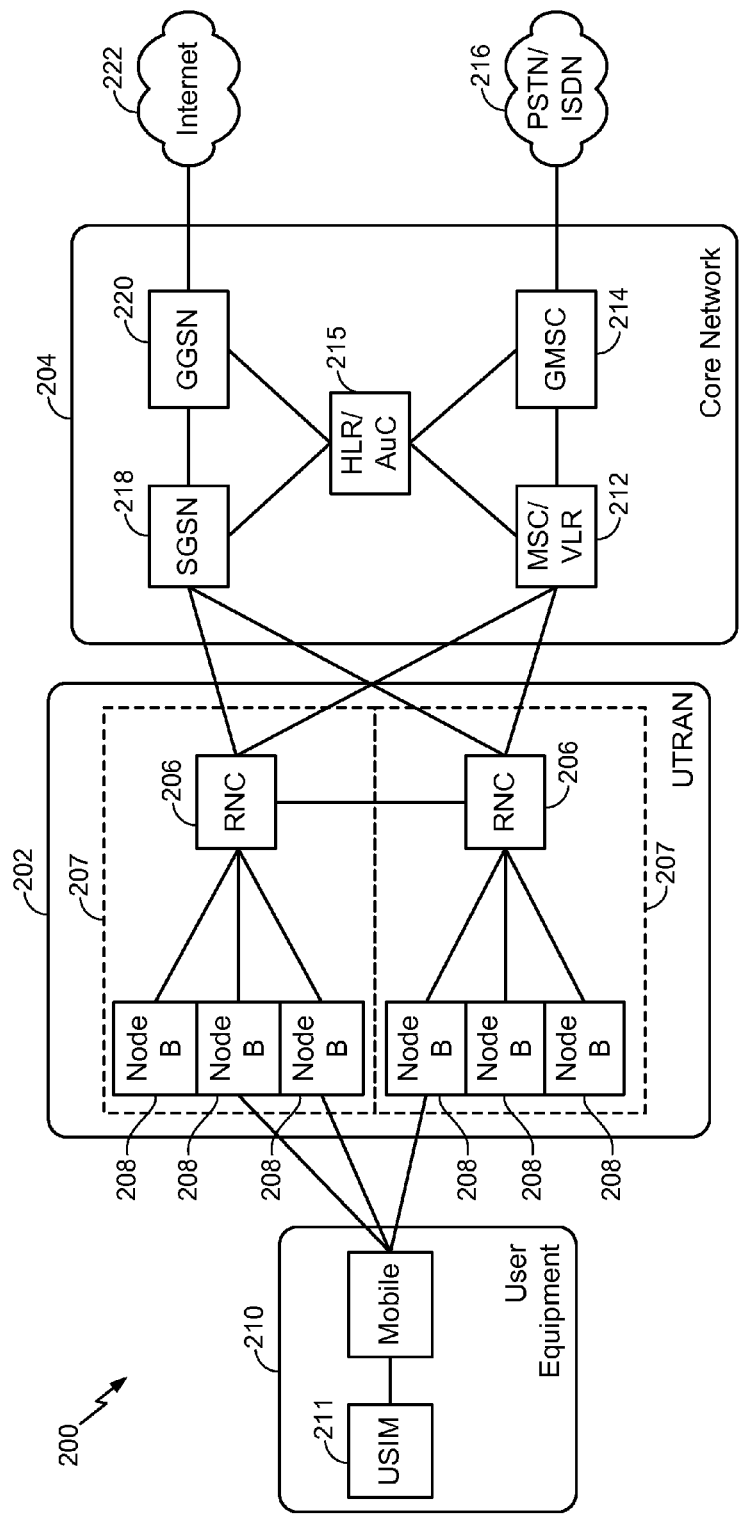
FIG. 6 is a block diagram conceptually illustrating an example of a telecommunications system including a user equipment configured to perform the functions described herein.

FIG. 5 is a block diagram illustrating an example of a hardware implementation for an apparatus 100 employing a processing system 114. Apparatus 100 may be configured to include, for example, wireless device 10 (FIG. 1) and/or cell monitor component 12 (FIG. 1) as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. In an aspect, the processor 104, the computer-readable medium 106, or a combination of both may be specially-programmed or configured to perform the functions described herein, such as the functions of cell monitor component 12 (FIG. 1).

The various concepts presented throughout this disclosure may be implemented across a broad variety of telecommunication systems, network architectures, and communication standards.

Referring to FIG. 5, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, wireless device 10 (FIG. 1) and/or cell monitor component 12 (FIG. 1) as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
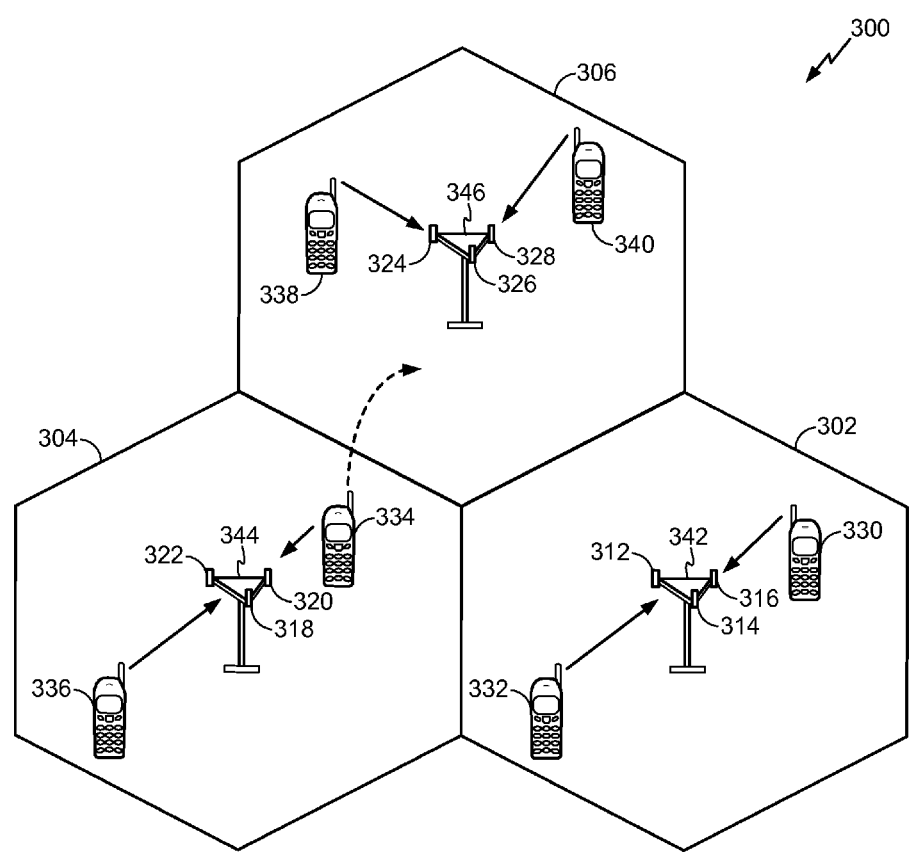
FIG. 7 is a conceptual diagram illustrating an example of an access network for use with user equipment configured to perform the functions described herein.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306. UEs 330, 332, 334, 336, 338, 340 may be configured to include, for example, wireless device 10 (FIG. 1) and/or cell monitor component 12 (FIG. 1) as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
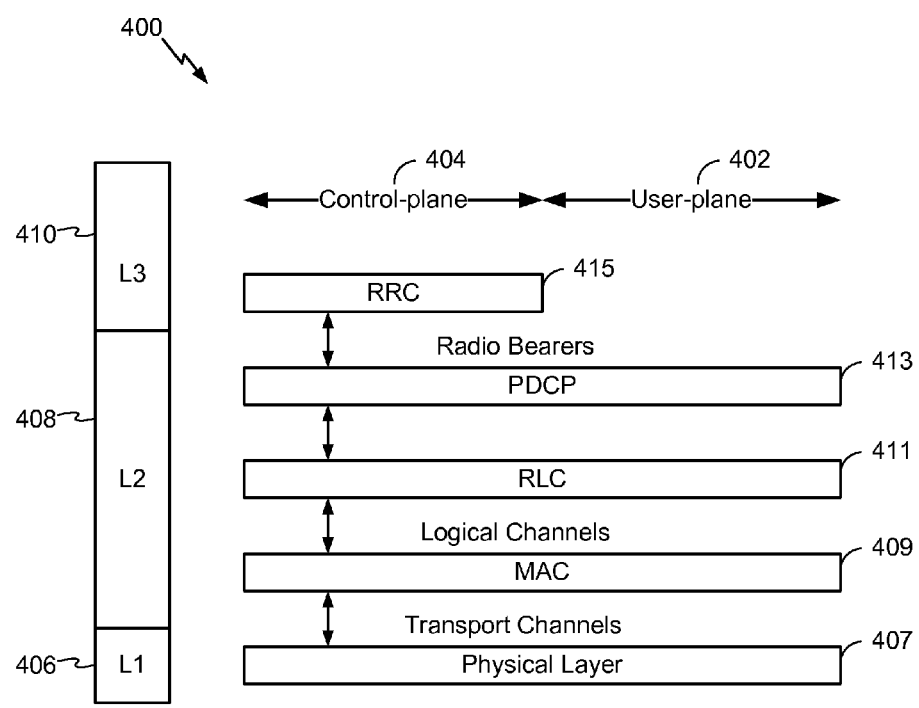
FIG. 8 is a conceptual diagram illustrating an example of a radio protocol architecture for the user and control planes for a base station and/or a user equipment configured to perform the functions described herein.

FIG. 8 is a conceptual diagram illustrating an example of the radio protocol architecture 400 for the user plane 402 and the control plane 404 of a user equipment (UE) or node B/base station. For example, architecture 400 may be included in a UE such as wireless device 10 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
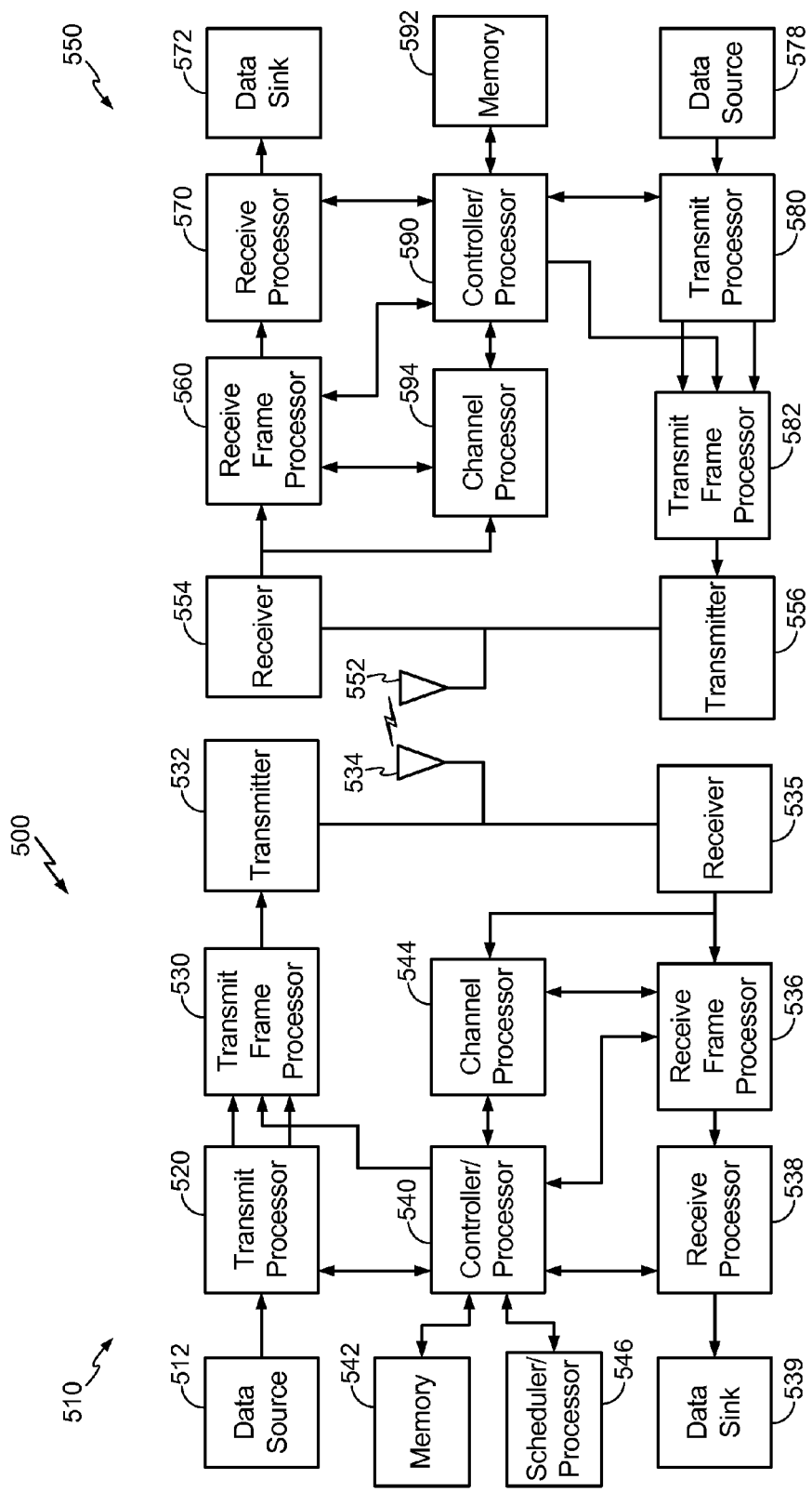
FIG. 9 is a block diagram conceptually illustrating an example of a telecommunications system including a Node B in communication with a user equipment configured to perform the functions described herein.

FIG. 9 is a block diagram of a communication system 500 including a Node B 510 in communication with a UE 550, where the UE 550 may be wireless device 10 in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 10:
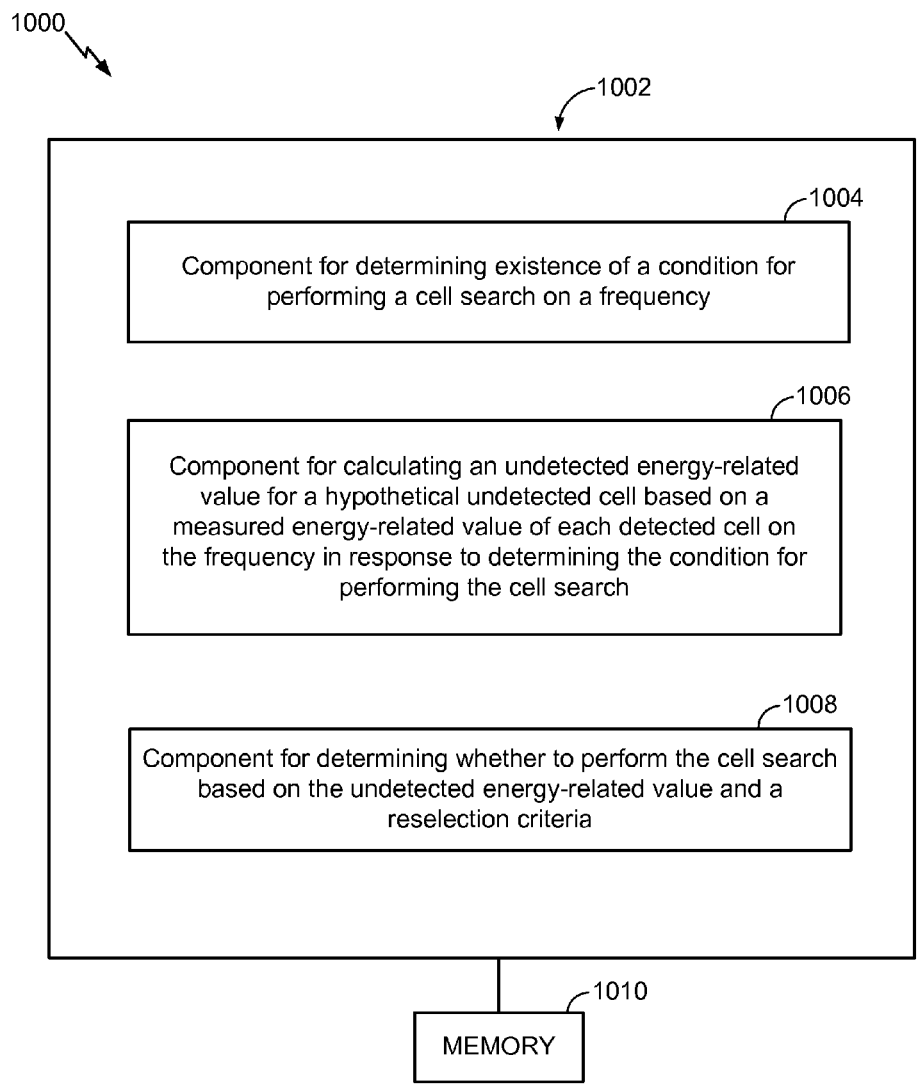
FIG. 10 is an example system that monitors radio channels in accordance with an aspect.

Referring now to FIG. 10, illustrated is a system 1000 configured for monitoring radio channels. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate monitoring radio channels. For instance, logical grouping 1002 may include component 1004 for determining existence of a condition for performing a cell search on a frequency. Further, logical grouping 1002 may comprise component 1006 for calculating an undetected energy-related value for a hypothetical undetected cell based on a measured energy-related value of each detected cell on the frequency in response to determining the condition for performing the cell search. In addition, logical grouping 1002 may include component 1008 for determining whether to perform the cell search based on the undetected energy-related value and a reselection criteria. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of a wireless device monitoring cells in a wireless communication system, comprising:
   determining existence of a condition for performing a cell search on a frequency;
   calculating, via a processor on the wireless device, an undetected energy-related value for a hypothetical undetected cell based on a measured energy-related value of each detected cell on the frequency in response to determining the condition for performing the cell search; and
   determining whether to perform the cell search based on the undetected energy-related value and a reselection criteria.

2. The method of claim 1, wherein determining to perform the cell search further comprises:
   performing the cell search when the undetected energy-related value meets the reselection criteria; and
   skipping the cell search when the undetected energy-related value does not meet the reselection criteria.

3. The method of claim 2, wherein skipping the cell search further comprises performing a search on a set of the detected cells on the frequency.

4. The method of claim 1, wherein determining whether to perform the cell search is further based on a suitability criteria.

5. The method of claim 4, wherein the suitability criteria is based on a minimum required quality level among the detected cells on the frequency.

6. The method of claim 4, wherein the suitability criteria is based on a minimum received signal level value among the detected cells on the frequency.

7. The method of claim 4, wherein determining to perform the cell search further comprises:
   performing the cell search when the undetected energy-related value meets the reselection criteria and the suitability criteria; and
   skipping the cell search when the undetected energy-related value does not meet the reselection criteria and the suitability criteria.

8. The method of claim 1, further comprising performing the cell search in phases.

9. The method of claim 8, further comprising:
   determining whether to proceed with a next phase of the cell search based on an energy-value of a set of detected cells or energy peaks on the frequency detected during an earlier phase of the cell search.

10. The method of claim 9, wherein determining to proceed with the next phase of the cell search further comprises:

calculating a revised undetected energy-related value based on the energy-value of the set of detected cells or energy peaks on the frequency detected during the earlier phase;

stopping any remaining phases of the cell search for finding the hypothetical undetected cell when the revised undetected energy-related value does not meet the reselection criteria; and proceeding with the next phase of the cell search when the revised undetected energy-related value meets the reselection criteria.

11. The method of claim 1, wherein calculating the undetected energy-related value further comprises calculating a pilot signal power-related value.

12. The method of claim 11, wherein calculating the pilot signal power-related value further comprises calculating a Common Pilot Indicator CHannel (CPICH) received signal code power (RSCP) or a ratio of CPICH received energy per chip to a received overall energy (Ec/Io).

13. The method of claim 1, wherein calculating the undetected energy-related value for the hypothetical undetected cell is based on the measured energy-related value of each detected cell on the frequency and a total energy on the frequency.

14. The method of claim 1, further comprising:
measuring a pilot signal power-related value for each detected cell on the frequency; and
wherein calculating the undetected energy-related value is further based on a combination of each measured pilot signal power-related value subtracted from a total energy on the frequency.

15. The method of claim 1, further comprising:
measuring signal power-related values of a plurality of overhead channels for each detected cell on the frequency; and
wherein calculating the undetected energy-related value is further based on a combination of the measured signal power-related values of a plurality of overhead channels subtracted from a total energy on the frequency.

16. The method of claim 1, further comprising:
measuring signal power-related values of a plurality of traffic channels for each detected cell on the frequency; and
wherein calculating the undetected energy-related value is further based on a combination of the measured signal power-related values of a plurality of traffic channels subtracted from a total energy on the frequency.

17. The method of claim 1, wherein determining existence of the condition for performing the cell search further comprises determining when the wireless device is in a Wideband Code Division Multiple Access (WCDMA) idle mode.

18. The method of claim 1, wherein determining existence of the condition for performing the cell search further comprises:
setting a cell search timer; and
detecting expiration of the cell search timer to identify existence of the condition for performing the cell search.

19. An apparatus for wireless communication, comprising:
means for determining existence of a condition for performing a cell search on a frequency;
means for calculating an undetected energy-related value for a hypothetical undetected cell based on a measured energy-related value of each detected cell on the frequency in response to determining the condition for performing the cell search; and
means for determining whether to perform the cell search based on the undetected energy-related value and a reselection criteria.

20. A non-transitory computer-readable medium storing computer executable code for monitoring cells in a wireless communication system, comprising:
code for determining existence of a condition for performing a cell search on a frequency;
code for calculating an undetected energy-related value for a hypothetical undetected cell based on a measured energy-related value of each detected cell on the frequency in response to determining the condition for performing the cell search; and
code for determining whether to perform the cell search based on the undetected energy-related value and a reselection criteria.

21. An apparatus for wireless communication, comprising:
at least one processor; and
a memory coupled to the at least one processor,
wherein the at least one processor is configured to:
determine existence of a condition for performing a cell search on a frequency;
calculate an undetected energy-related value for a hypothetical undetected cell based on a measured energy-related value of each detected cell on the frequency in response to determining the condition for performing the cell search; and
determine whether to perform the cell search based on the undetected energy-related value and a reselection criteria.

22. An apparatus for monitoring cells in a wireless communication system, comprising:
a condition determiner component operable to determine existence of a condition for performing a cell search on a frequency;
an energy calculator component operable to calculate an undetected energy-related value for a hypothetical undetected cell based on a measured energy-related value of each detected cell on the frequency in response to determining the condition for performing the cell search; and
a cell search determiner component operable to determine whether to perform the cell search based on the undetected energy-related value and a reselection criteria.

23. The apparatus of claim 22, further comprising:
a cell monitoring component operable to perform the cell search when the undetected energy-related value meets the reselection criteria; and
the cell monitoring component being further operable to skip the cell search when the undetected energy-related value does not meet the reselection criteria.

24. The apparatus of claim 23, wherein the cell monitoring component is further operable to perform a search on a set of the detected cells on the frequency when the cell search is skipped.

25. The apparatus of claim 22, wherein the cell search determiner component is further operable to determine whether to perform the cell search based on a suitability criteria.

26. The apparatus of claim 25, wherein the suitability criteria is based on a minimum required quality level among the detected cells on the frequency.

27. The apparatus of claim 25, wherein the suitability criteria is based on a minimum received signal level value among the detected cells on the frequency.

28. The apparatus of claim 25, further comprising:
a cell monitoring component operable to perform the cell search when the undetected energy-related value meets the reselection criteria and the suitability criteria; and
the cell monitoring component being further operable to skip the cell search when the undetected energy-related value does not meet the reselection criteria and the suitability criteria.

29. The apparatus of claim 22, further comprising a cell monitoring component operable to perform the cell search in phases.

30. The apparatus of claim 29, wherein the cell search determiner component is further operable to determine whether to proceed with a next phase of the cell search based on an energy-value of a set of detected cells or energy peaks on the frequency detected during an earlier phase of the cell search.

31. The apparatus of claim 30, wherein the energy calculator component is further operable to calculate a revised undetected energy-related value based on the energy-value of the set of detected cells or energy peaks on the frequency detected during the earlier phase;
wherein the cell monitoring component is further operable to stop any remaining phases of the cell search for finding the hypothetical undetected cells when the revised undetected energy-related value does not meet the reselection criteria; and
wherein the cell monitoring component is further operable to proceed with the next phase of the cell search when the revised undetected energy-related value meets the reselection criteria.

32. The apparatus of claim 22, wherein the energy calculator component is further operable to calculate the undetected energy-related value by calculating a pilot signal power-related value.

33. The apparatus of claim 32, wherein calculating the pilot signal power-related value further comprises calculating a Common Pilot Indicator CHannel (CPICH) received signal code power (RSCP) or a ratio of CPICH received energy per chip to a received overall energy (Ec/Io).

34. The apparatus of claim 22, wherein the energy calculator component is further operable to calculate the undetected energy-related value for the hypothetical undetected cell based on the measured energy-related value of each detected cell on the frequency and a total energy on the frequency.

35. The apparatus of claim 22, further comprising:
a measuring component operable to measure a pilot signal power-related value for each detected cell on the frequency; and
wherein the energy calculator component is further operable to calculate the undetected energy-related value based on a combination of each measured pilot signal power-related value subtracted from a total energy on the frequency.

36. The apparatus of claim 22, further comprising:
a measuring component operable to measure signal power-related values of a plurality of overhead channels for each detected cell on the frequency; and
wherein the energy calculator component is further operable to calculate the undetected energy-related value based on a combination of the measured signal power-related values of a plurality of overhead channels subtracted from a total energy on the frequency.

37. The apparatus of claim 22, further comprising:
a measuring component operable to measure signal power-related values of a plurality of traffic channels for each detected cell on the frequency; and
wherein the energy calculator component is further operable to calculate the undetected energy-related value based on a combination of the measured signal power-related values of a plurality of traffic channels subtracted from a total energy on the frequency.

38. The apparatus of claim 22, wherein the condition determiner component is further operable to determine existence of a condition for performing the cell search by determining when the wireless device is in a Wideband Code Division Multiple Access (WCDMA) idle mode.

39. The apparatus of claim 22, wherein the condition determiner component is further operable to set a cell search timer and detect expiration of the cell search timer to identify existence of the condition for performing the cell search.

* * * * *